US008297977B2

(12) United States Patent
Freund

(10) Patent No.: US 8,297,977 B2
(45) Date of Patent: *Oct. 30, 2012

(54) SYSTEM AND METHOD FOR AUTOMATIC DRIVER EVALUATION

(75) Inventor: Barbara Freund, Virginia Beach, VA (US)

(73) Assignee: Eastern Virginia Medical School, Norfolk, VA (US)

( * ) Notice: Subject to any disclaimer, the term of this patent is extended or adjusted under 35 U.S.C. 154(b) by 702 days.

This patent is subject to a terminal disclaimer.

(21) Appl. No.: 11/976,254

(22) Filed: Oct. 23, 2007

(65) Prior Publication Data

US 2008/0108022 A1    May 8, 2008

Related U.S. Application Data

(63) Continuation-in-part of application No. 11/484,614, filed on Jul. 12, 2006.

(60) Provisional application No. 60/697,950, filed on Jul. 12, 2005.

(51) Int. Cl.
*A61C 11/00* (2006.01)

(52) U.S. Cl. ............................................. 434/65; 434/62

(58) Field of Classification Search .............. 434/29–72, 434/219, 236, 350; 340/576
See application file for complete search history.

(56) References Cited

U.S. PATENT DOCUMENTS

| | | |
|---|---|---|
| 4,034,484 A | 7/1977 | Radice |
| 4,276,030 A | 6/1981 | Radice |
| 4,750,888 A | 6/1988 | Allard et al. |
| 4,846,686 A | 7/1989 | Adams |
| 5,015,189 A | 5/1991 | Wenzinger |
| 5,131,848 A | 7/1992 | Adams |
| 5,269,687 A | 12/1993 | Mott et al. |
| 5,597,359 A | 1/1997 | Byerly |
| 5,618,179 A | 4/1997 | Copperman et al. |
| 5,660,547 A | 8/1997 | Copperman |
| 5,888,074 A | 3/1999 | Staplin et al. |
| 2004/0158476 A1* | 8/2004 | Blessinger et al. ............... 705/1 |
| 2009/0202964 A1* | 8/2009 | Simon ............................. 434/62 |

OTHER PUBLICATIONS

Restrict.pdf—Jane C. Stutts; J. Richard Stewart; Sarah Van-Heusen-Causey—'An Evaluation of Restricted Licensing for North Carolina's Older Drivers', Final Project Report Prepared for the North Carolina's Governors Highway Safety Program, University of North Carolina Highway Research Center, Chapel Hill, NC.—Dec. 2000.*
Rizzo, Matthew, et al. 'Demograhic and Driving Performance Factors in Simulator Adaption Syndrome'—Proceedings of the Second International Driving Symposium on Human Factors in Driver Assessment, Training, and Vehicle Design (2003).*

(Continued)

*Primary Examiner* — Timothy A Musselman
(74) *Attorney, Agent, or Firm* — Wilmer Cutler Pickering Hale and Dorr LLP

(57) ABSTRACT

Embodiments of the present invention provide a system and method for automatic driver evaluation of a person's driving capabilities and render an outcome of pass, fail, or pass with restrictions without the need for a trained observer to evaluate driver's performance. In one embodiment, the automatic driver evaluation system facilitates the display of a predetermined driving route designed for a predetermined demography, observe simulated driving performance of a user on the predetermined driving route, record errors made by the user while performing the simulated drive, and compare the performance errors to at least one threshold value and generate a score based on the comparison.

37 Claims, 6 Drawing Sheets

OTHER PUBLICATIONS

PCT International Search Report for Application No. PCT/US06/26942 dated Aug. 17, 2007.
Freund, et al., "Self-rated driving performance among elderly drivers referred for driving evaluation," Accident Analysis & Prevention, vol. 37, Issue 4, pp. 613-618, Jul. 2005.
McGhee, D et al., "Quantitative analysis of steering adaptation on a high performance fixed-base driving simulator," Transportation Research Part F. Traffic Psychology and Behavior, 7(3),181-196 (2004).
Rizzo, M., et al., "Simulated Car Crashes at Intersections in Drivers With Alzheimer Disease," Alzheimer Disease & Associated Disorders, 15(1):10-20 (2001).
Shulman, K.I., "Clock-drawing: Is it the ideal cognitive screening test?," International Journal of Geriatric Psyciatry, 15:548-561 (2000).
Uc, E., et al., "Unsafe rear-end collision avoidance in Alzheimer's disease," J. Neurological Sciences, 251:35-43 (2006).
Freund, B. et al., "Error specific restrictions for older drivers; promoting continued independence and public safety." Accid. Anal. Prev. 40(1), pp. 97-103. Jan. 2008.
Freund, B. et al., "Office based evaluation of the older driver." J. Am. Geriatr. Soc. 54(12), pp. 1943-1944. Dec. 2006.
Freund, B., et al., "Recognizing and evaluating potential dementia in office settings." Clin. Geriatr. Med. 20(1), pp. 1-14. Feb. 2004.
Freund, B. et al., "Effects of cognition on driving involvement amongst the oldest old: variations by gender and alternative transportation opportunities." The Gerontologist. 42(5), pp. 621-633. Oct. 2002.
Freund et al., "In my car the brake is on the right: pedal errors among older drivers," Accid. Anal Orev., 40(1), pp. 403-409. Jan. 2008.
Owlsley, C. et al., "Visual processing impairment and risk of motor vehicle crash among older adults." Jama. 279(14), pp. 1083-1088. 1998.
Preusser, D. et al., "Fatal crash risk for older drivers at intersections." Accid. Anal. And Prev. 30:2, pp. 151-159. 1998.
Wallace, R. et al. "Cognitive change, medical illness, and crash risk among older drivers: an epidemiological consideration." Alzheimer Dis. Assoc. Disord. 11:1, pp. 31-37. 1997.
Wang, C. et al. "Older driver safety: a report from the Older Drivers Project." J. Am. Geriatric Soc. 52, pp. 143-149. 2004.
Freund, B. et al. "The older adult driver: issues and concerns for the geriatric clinician." Annals of Long Term Care Clinical Care, 11(9): 37-39 (Sep. 2003) (3 pages).
Freund, B. et al. "Clock drawing test tracks progression of driving performance in cognitively impaired older adults: case comparisons." Clinical Geriatrics, 12(7): 33-36 (Jul. 2004) (6 pages).
Freund, R. et al. "Silicone block interposition for traumatic bone loss." Orthopedics, 23(8): 795-804 (Aug. 2000) (4 pages).
Freund, B et al. "Simulator sickness amongst older drivers with and without dementia." Advances in Transportaion Studies, and International Journal, Special Issue, 71-74 (2006) (4 pages).
Freund, B. et al. "Drawing clocks and driving cars, use of brief tests of cognition to screen driving competency in older adults." J. Gen. Intern. Med., 20: 240-244 (2005) (4 pages).
Freund, B., et al. "Continued driving and time to transition to non-driver status through error specific driving restrictions." Gerontology and Geriatrics Education, 29(4): 326-335 (2008) (10 pages).
Freund, B., et al. "Evaluating driving performance of cognitively impaired and heathy older adults: a pilot study comparing on-road testing and driving simulation." JAGS, 50(7): 1309-1310 (2002) (2 pages).
Gravenstein, S., et al. "Surveillance for respiratory illness in long-term care settings: detection of illness using a prospective research technique." JAMDA, 122-128 (May/June, 2000) (7 pages).
Petrakos, D., et al. "Driving habits of Older drivers three months prior to driving evaluation." Topics in Geriatric Rehabilitation, 25(2): 118-134 (2009) (17 pages).
Risser, M., et al. "Driving simulation performance in the elderly with mild cognitive impairment." SLEEP, 23, Abstract Supplement #2, Abstract 1643.H: A210 (Apr. 15, 2000) (2 pages).

* cited by examiner

SYSTEM AND METHOD FOR AUTOMATIC DRIVER EVALUATION

RELATED APPLICATIONS

This application is a continuation in part of U.S. patent application Ser. No. 11/484,614, filed Jul. 12, 2006, which claims benefit to a U.S. Provisional Patent Application No. 60/697,950, filed Jul. 12, 2005.

FIELD OF THE INVENTION

This invention generally relates to a vehicle simulation system, and particularly to a simulator for land vehicles which accurately simulates driving a vehicle in various conditions and which is capable of monitoring and determining the capability of a motor vehicle driver.

BACKGROUND OF THE INVENTION

There is a continuing increase in the density of vehicles traveling the world's roadways. This increase raises the probability of vehicles colliding with objects. Simultaneously, a need to improve the safety of vehicle operations, as it currently stands, by reducing the occurrences of vehicles colliding with stationary and moving objects (such as roadside obstacles and other vehicles) is present. Motor vehicle safety devices have continuously improved over the years and have made driving a safer experience. Many of these safety devices, such as seat belts and air bags are designed to protect occupants in the event of a crash. Other devices, such as anti-lock braking systems are intended to assist the driver's performance to prevent a crash. Such systems assume an alert and competent driver, but this is not always the case. A driver may not be fully alert or capable of making appropriate decisions for any number of reasons. For example, these include drowsiness, talking on a cellular phone, changing the radio stations, dealing with unruly children, mental fatigue, age, medical conditions and the like.

Driving is a complex task and requires a range of cognitive and psychomotor abilities that include memory, judgment, motor control and speed, decision-making, and attention. These skills are necessary for safe driving and often decline as we age. Aging presses the issue of driving competence. Driving places demands on attention, memory, problem solving and information processing, the cognitive faculties that decline with aging. Older drivers crash at a rate second only to the youngest drivers. Older driver involvement in fatal crashes is projected to increase 155% by 2030, accounting for 54% of the total projected increase in fatal crashes among all drivers. As the population ages and the number of older drivers increases, declining driver competence becomes an urgent public health problem and a challenge to recognize impaired driving ability in the elderly.

Crashes receiving national attention include older drivers reportedly confusing the gas and brake pedals. In all reported cases, the drivers admitted mistakenly using the accelerator instead of the brake. During such unintended acceleration (UA), drivers experience full, unexpected acceleration, often colliding with nearby objects and resulting in injuries or death to the driver or others in the immediate environment. Examination of the vehicles immediately after the accident reveals normally functioning brake and fuel delivery systems.

The cause of UA is not well understood, and measures to predict the likelihood of future UA events do not exist. UA accidents are more likely to involve older drivers (100-600% over-involvement of drivers 60 and older) (U.S. DOT, 1989) and may belie underlying cognitive deficits. The prevalence of cognitive impairment is estimated to be 10% of apparently healthy individuals over the age of 65 in an academic practice (Sager, 2003). While up to one-third of all people aged over 65 years may be demented, even dementia is overlooked in 25 to 90% of older adults, some 5 million people. Age is the primary risk factor for cognitive impairment, dementia, and UA. Thus, cognitive impairment may be a good predictor of UA and UA accidents. Furthermore, specific types of cognitive impairment are likely to be predictive of UA outcomes, and UA may be one outcome of an overall driver pedal error issue.

One means for reconciling these factors is to evaluate a driver's operational performance over time to determine if the driver has lost the capability of operating the vehicle safely. Whenever a driver is responsible for operating a motor vehicle, it is critical that the driver be capable of demonstrating basic cognitive and motor skills at a level that will assure the safe operation of the vehicle. A number of conditions can impair a driver's ability to perform the basic cognitive and motor skills that are necessary for the safe operation of a motor vehicle. It is desirable to evaluate a driver's ability to identify hazardous conditions and correctly react to those conditions while operating a motor vehicle.

Typically, people whose driving capabilities are questioned are evaluated by the Department of Motor Vehicles or an occupational therapist. This requires a human evaluator to ride with the subject and evaluate them based on some criteria. However, road test courses and evaluator training have not been standardized. An evaluator's background and training are variable. This introduces subjectivity and potential bias in that not all road tests are standardized and one cannot control variables such that all subjects will experience the same test or such that all will face specific events that could be a hazard to them. For example, not all drivers would be faced with a pedestrian walking into the path of the vehicle or a car running red light when the driver approaches the intersection with a green light. Further, road tests have relied on the expert opinion of the examiners in which errors are determined either as driving errors that violate the rules of the road or by the judgment of the examiner as to what constitutes an important error. However, some errors are typical of experience drivers (e.g., rolling stop at a stop sign) and may not be relevant to competence decisions. Finally, road tests can be costly and dangerous when the driver is very incompetent.

Laboratory measures, such as neuropsychological tests, have been used to infer poor driving skills based upon poor test performance, but have met with mixed success. While poorer global cognitive performance is associated with impaired driving, the specificity of the neuropsychological measures has been limited. Measures of visual attention and executive function appear to be the most promising of the in-clinic measures. Accident history (often based upon accidents per million miles) has been used to examine whether certain populations are at greater risk for on-road accidents. While this provides a valid measure of "real world" risk, it does not inform individual risks and may over- or underestimate risk depending upon the driving environs.

The emergence of driving simulators have provided an opportunity to evaluate under addressed skills such as accident avoidance and navigational abilities, and to experimentally delineate the components of driving performance. Concerns remain regarding their realism and usability in various populations. Fully interactive driving simulator system are also available that puts drivers behind the wheel before they drive on the highway. These simulators provide 3-screens with an expanded field of view for realism. Alternatively, single-screen system are also available that allow drivers to replicate the actions necessary to develop and reinforce driving skills and habits. These typically include a car seat, steering wheel, accelerator, brake pedals, desktop, console, or customized driving controls; regular, wide field-of-view and head-mounted display options; and validated high-fidelity, non-linear, vehicle and tire models. While there are simulators capable of automatically recording crashes, reaction time, speed, tickets and response to tasks of divided attention, these simulators merely score, but do not determine whether the driver has passed or failed the test. Further, these simulators require a human evaluator to render an opinion as in the road testing.

The creation of the restricted driver classification is important for public health and safety. Many older driver evaluation services are designed to determine who is no longer safe to drive, providing documentation and legitimacy for driving cessation whether forced or voluntary. By acknowledging an intermediate level of driving skill and ability, we are piloting clinic-based driving optimization efforts. The negative consequences of driving cessation are real and deeply felt by many older drivers. Handing over the keys is often tantamount to a resignation of freedom, independent mobility, and management of personal affairs. The psychosocial repercussions of driving cessation demand special consideration. Driving is an important part of mobility and socialization for older adults. Driving cessation is a major decision, often associated with an increase in depressive symptomology and potential social isolation. Access to friends and family, employment, shopping and commerce, personal care, educational and cultural enrichment, and religious expression, often necessitates transportation from one location to another. High levels of mobility mean high levels of access, choice, and opportunity, which can lead to self-fulfillment and enrichment. Low levels of mobility can lead to isolation and cultural impoverishment. Clinical and policy-related discernment of driving fitness must therefore, be carefully executed and guided by proper testing and screening methods. As the numbers of older drivers increase, it becomes essential to optimize driving for capable older adults and to ensure that only those who pose no risk to themselves or others on the road continue to drive.

It would be desirable to have a system that combines a simulator with a method to automatically evaluate a person's driving capabilities and render an outcome of pass, fail, or driving with restrictions without the need for a trained observer to evaluate driver's performance. It would also be desirable to have a system that combines a simulator with a method to automatically assign type of restrictions on drivers with restrictions.

Accordingly, the present invention is directed to these, as well as other, important ends.

SUMMARY OF THE INVENTION

The present invention provides a system and method for automatic driver evaluation that evaluate a person's driving capabilities and render an outcome of pass, fail, or pass with restrictions without the need for a trained observer to evaluate driver's performance.

Accordingly, the present invention relates to system and method for automatic driver evaluation, which include the operative steps of recording performance errors of users performing simulated drive, wherein the users belong to a predetermined demography, wherein the simulated drive is performed on a predetermined driving route designed for the predetermined demography; comparing the performance errors to at least one threshold value, wherein the threshold value include at least two hazardous errors, at least two traffic violations, or at least one rule violations and at least one traffic violations; and displaying outcome as pass with restrictions if the performance errors include at least one hazardous error, at least one traffic violations, or at least one rule violations.

More specifically, the performance errors include hazardous errors, traffic violations, or rule violations; and the pass with restrictions include limited driving, reevaluation, co-pilot, environmental restrictions, and retraining/equipment needs, wherein limited driving includes limit driving distance to familiar areas and limit driving time due to fatigue, wherein reevaluation include discontinue driving until medication adjustment/reevaluation and discontinue driving until medical follow-up and reevaluation, wherein co-pilot include navigator for unfamiliar areas, wherein environmental restrictions include daytime only and use traffic for speed cues, wherein retraining/equipment needs include adaptive equipment needed and gradually increase driving exposure.

In one example of the present invention, the method further includes the operative step of displaying performance outcome as fail if at least two performance errors are hazardous errors. In another example of the present invention, the method further includes the operative step of displaying performance outcome as fail if the performance errors are at least two traffic violations. In yet another example of the present invention, the method further includes the operative step of displaying performance outcome as fail if the performance errors are at least one rule violations and at least one traffic violations.

In an example of the present invention, the predetermined driving route comprises driving tasks. More specifically, the driving tasks comprises stopping on red light when executing right turns, left turns when there is no oncoming or cross traffic, left turns when there is oncoming traffic, driver has throughway during green lights, driver required to stop at stop-signs, driver required to change lane when there is a reduction in number of lanes, driver required to slow speed to avoid collision when pedestrians are jaywalking, driver required to slow speed to avoid collision when cars pull into path of driver, and driver required to change speeds when speed limit changes.

In one example of the present invention, the hazardous errors comprises crash involving pedestrian, crash involving building, crash involving vehicle, driving in the lane of oncoming traffic, turning from the wrong lane, unable to maintain lane position, and unintended acceleration.

In another example of the present invention, the traffic violations comprises running red light, running stop sign, speeding, driving at a speed of at least 10 miles per hour less than the posted speed limit, stopping without reason, and straddling lane for at least 6 seconds.

In yet another example of the present invention, the rule violations comprises failing to turn, turning in direction opposite of command, and poor control of vehicle during divided attention task.

In one example of the present invention, the method further comprised the operative step of determining fitness to drive based on the errors made by the user while performing the simulated drive. In one example of the present invention, the errors made by the user while performing the simulated drive is determined for at least 30 minutes or until the completion of the last driving task in the predetermined route. In another example of the present invention, the predetermined driving route is at least one urban course and the predetermined demography comprises 60 years or older.

In another example of the present invention, a system for evaluating driving capabilities of a user in a simulated environment is provided. The system includes a first display device configured to display a predetermined driving route, wherein the predetermined driving route is designed for a predetermined demography; a control device configured to observe simulated driving performance of a user on the predetermined driving route; a storage device configured to store errors made by the user while performing the simulated drive; a comparator configured to the performance errors to at least one threshold value, wherein the threshold value include at least two hazardous errors, at least two traffic violations, or at least one rule violations and at least one traffic violations; and a second display device configured to display outcome as pass with restrictions if the performance errors include at least one hazardous error, at least one traffic violations, or at least one rule violations. The system according to present invention, further comprises a plurality of input devices for controlling the position of a simulated vehicle in the simulated environment.

More specifically the input device comprises accelerator pedal, brake pedals, adjustable seats, throttle, dashboard, and steering wheel. Also, according to the system of the present invention, the display unit provides at least 135 degree angle field of view, wherein the display unit comprises a ceiling mounted digital projector, and at least one screen, or a computer monitor. In an example of the system according to present invention, the simulated environment is a driving cab, wherein the simulated environment comprises at least one desk, at least one chair, modular steering, modular dash, and at least one modular pedal.

In another example, the present invention relates to a computer program product, residing on a computer-readable medium, the computer program product comprising computer instructions for configuring a computer to perform the acts of recording performance errors of users performing simulated drive, wherein the users belong to a predetermined demography, wherein the simulated drive is performed on a predetermined driving route designed for the predetermined demography; comparing the performance errors to at least one threshold value, wherein the threshold value include at least two hazardous errors, at least two traffic violations, or at least one rule violations and at least one traffic violations; and displaying outcome as pass with restrictions if the performance errors include at least one hazardous error, at least one traffic violations, or at least one rule violations.

In an example of the computer program product of the present invention, wherein the instructions for performing the act of comparing the performance errors to at least one threshold value further comprises the instructions for performing the act of displaying performance outcome as fail if at least one performance error is a hazardous error.

In another example of the computer program product of the present invention, wherein the instructions for performing the act of comparing the performance errors to at least one threshold value further comprises the instructions for performing the act of displaying performance outcome as fail if the performance errors are at least two traffic violations.

In another example of the computer program product of the present invention, wherein the instructions for performing the act of comparing the performance errors to at least one threshold value further comprises the instructions for performing the act of displaying performance outcome as fail if the performance errors are at least one rule violations and at least one traffic violations.

In yet another example of the computer program product of the present invention, wherein the instructions for performing the act of comparing the performance errors to at least one threshold value further comprises the instructions for performing the act of determining fitness to drive based on the errors made by the user while performing the simulated drive.

DETAILED DESCRIPTION

Embodiments of the present invention provide a system and method for automatic driver evaluation. Embodiments of the present invention provides recommendations based on both objective performance indicators and render an outcome of pass, fail, or driving with restrictions without the need for a trained observer to evaluate driver's performance. Safe drivers (those with no hazardous errors or traffic violations) are instructed to continue driving at normal or current level of activity. Unsafe drivers (those who commit hazardous errors and/or traffic violations that place them in hazardous situations) are instructed to discontinue driving at the current time. A third and intermediate performance group of restricted drivers are those who have committed traffic or rule violations only under certain driving conditions, for example, distracted when passengers present. Restricted drivers are instructed to continue driving but only under certain circumstances or within specific time and distance parameters.

Figure 1:
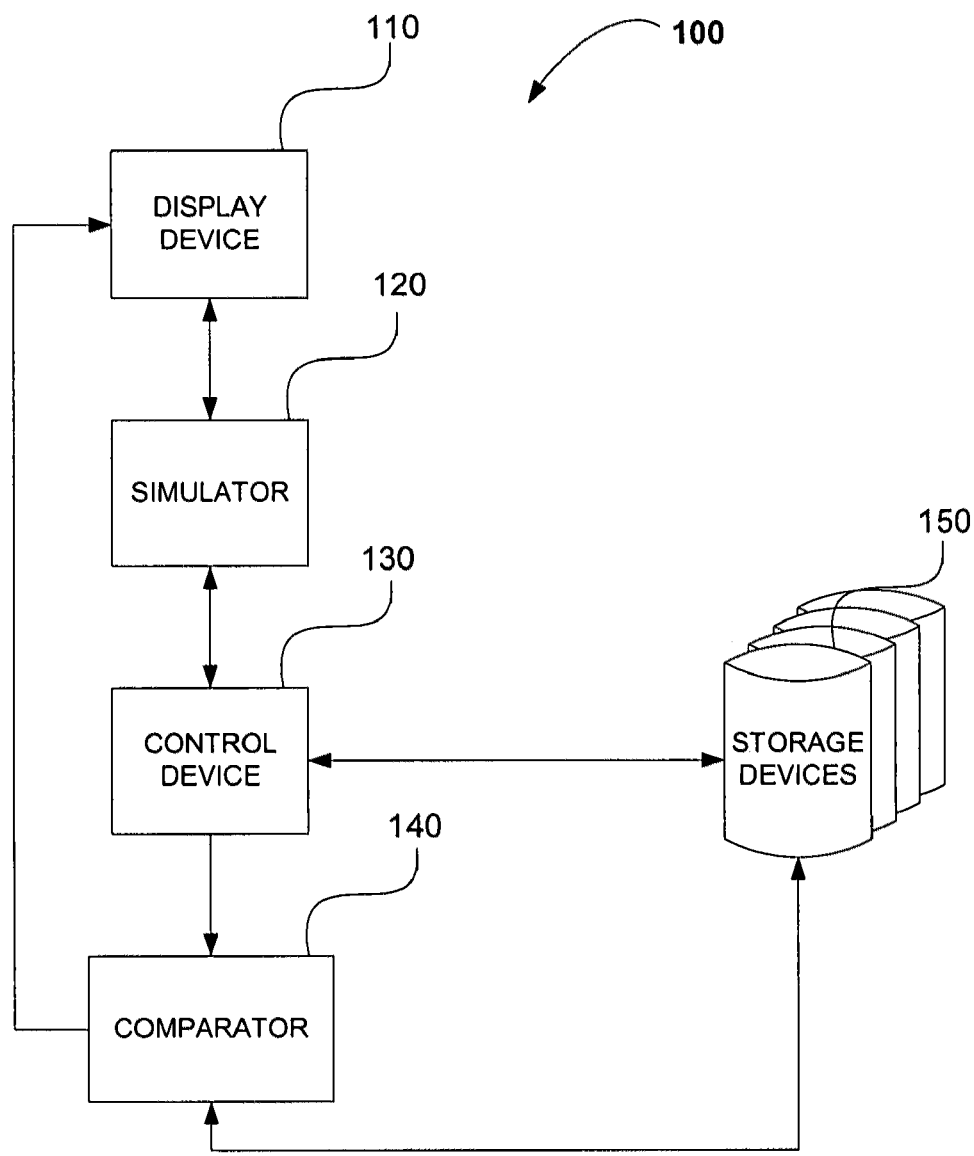
FIG. 1. is a block diagram illustrating an example automatic driver evaluation system in accordance with various embodiments of the present invention.

Referring now to the drawings, and more particularly, to FIG. 1, there is shown an automatic driver evaluation system, generally designated 100, for monitoring and evaluating the capability of a motor vehicle driver which incorporates various embodiments of the present invention. System 100 includes at least one display device 110, at least one simulator 120, at least one control device 130, at least one comparator 140, and at least one storage device 150, each as described in reference to FIG. 1.

In one example of the present invention, the display device 110 receives data from the simulator 120 to display a simulated environment. In one example of the present invention, the simulated environment is an urban driving course. The display device 110 may include a plurality of video devices arranged in a semi-circle to give the user a simulated view similar to that of a real vehicle such as a car. In another example of the present invention, the display device 110 may include a plurality of ceiling mounted digital projectors that display roadway images on a plurality of screens thereby providing at least 135° field of view. In yet another example of the present invention, the display device 110 may include a computer monitor. In some embodiments of the present invention, display device 110 may include a virtual reality device.

The simulator 120 then initiates a predetermined driving route for a user belonging to a predetermined demography and the display device 110 displays the predetermined route in the simulated environment. The predetermined driving route can be one of a number of driver testing route stored within the storage device 150 which can be downloaded into the simulator 120.

The simulator 120 updates the predetermined route by reading the input signals provided by the user via user input devices (not shown) connected to the control device 130. (e.g., Raydon Virtual Driver™, Raydon Corporation, Daytona Beach, Fla.; STISIM Drive, Systems Technology, Inc., Hawthorne, Calif.). The control device 130 uses these inputs signals to determine the position of the simulated vehicle driven by the user in the simulated environment by sending signals representative of the user's driving actions. The simulator 120 receives signals (e.g., digitized or analog) from the control device 130 and accordingly applies the position information from the control device 130 to the new position of the simulated vehicle, and initiates signals to drive the display device 110 to display the updated position of the simulated vehicle on the predetermined driving route in the simulated environment. Thus, the user is presented with real-time feedback that is personalized according to the user's own individual performance and what the user encounters in the simulated environment. The location information provided by the control device 130 is further used to record the paths of the simulated vehicles that the user has driven through the predetermined driving route for a predetermined time period. The length of the predetermined time period is long enough to test the ability to drive a typical length of drive without losing concentration for a given demography group. In one example embodiment of the present invention, the predetermined time period is at least 30 minutes for user demographic of 60 years or older. Further, the control device 130 determines the performance errors of the user based on the actions required by the driving tasks in the predetermined driving route.

The data from the control device 130 representative of the user's driving actions is also sent to the comparator 140. The comparator 140 utilizes this data to compare with threshold values of the predetermined driving route to determine the performance outcome of the driving test and stores the results back in the storage device 150. Display device 110 receives data from comparator 140 to display the performance outcome of the driving test.

In this fashion, the simulation system 100 of the present invention allows the user to drive a simulated vehicle through a predetermined driving route in a simulated environment, which contains traffic lights, and other vehicles, which can be programmed to create traffic situations in the simulated environment, to which the user must respond.

Figure 2:
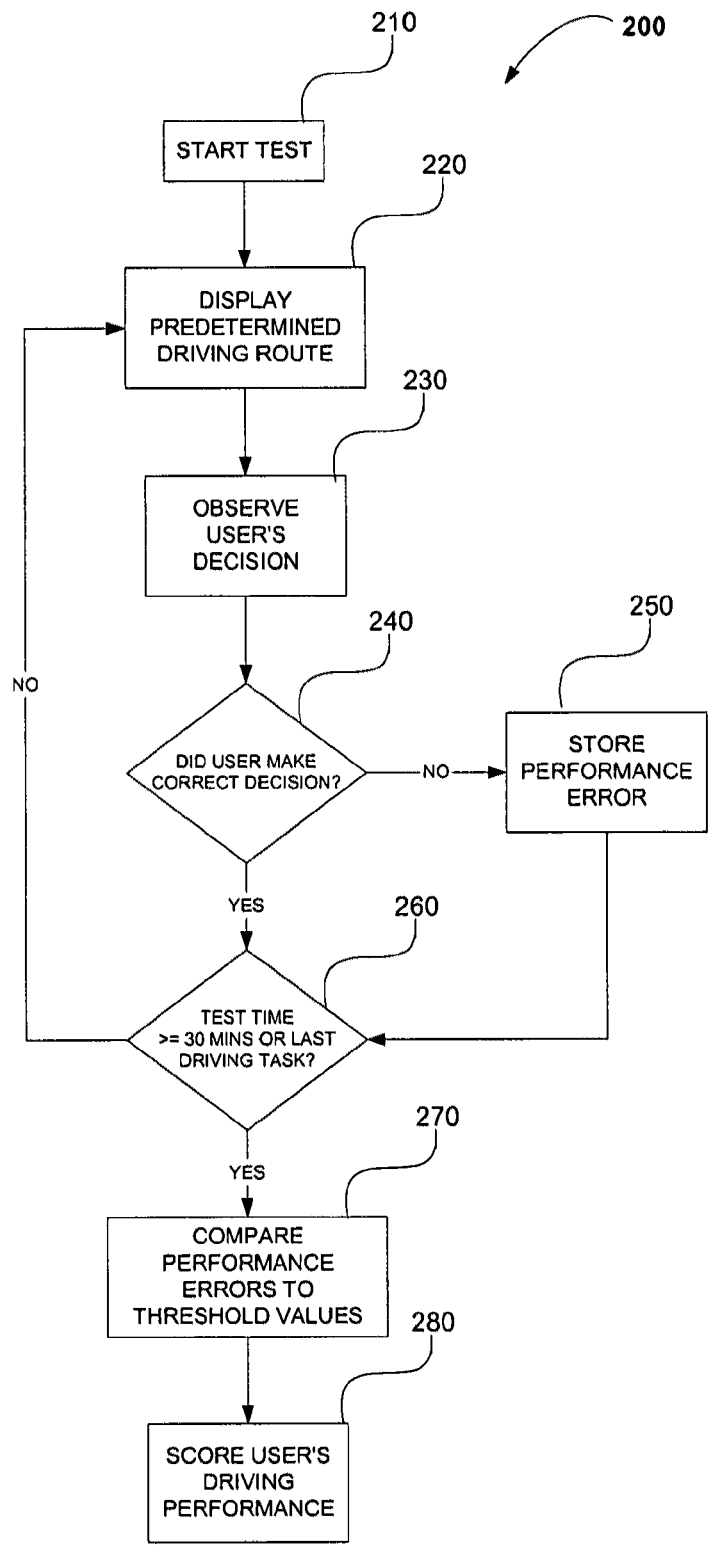
FIG. 2. is a flow chart illustrating a method for automatic evaluation of driver capabilities in accordance with various embodiments of the present invention.

FIG. 2, generally at 200, illustrates an exemplary method in accordance with an embodiment of the present invention. At step 210, simulator 120 sends data corresponding to a predetermined route in a simulated environment to display device 110. The data for the predetermined driving route includes driving tasks designed to evaluate driving capabilities of a specific demography of users for a predetermined time period. The length of the predetermined time period is long enough to test the ability to drive a typical length of drive without losing concentration for a given demography group. In an example of the present invention, the predetermined time period is at least 30 minutes. In another example of the present invention, the predetermined time period is at least 60 minutes. In yet another example of the present invention, the predetermined time period is at least 90 minutes. In one example of the present invention, the demography of users is at least 60 years. In another example of the present invention, the demography of users is 18 years or younger. In an example of the present invention, the demography of users includes different groups with certain medical conditions, for example, neurological conditions including strokes, dementia; post-operative conditions affecting either cognition (e.g., coronary artery bypass surgery) or sensory/motor function and/or cognition (e.g., total hip and total knee replacement surgery). In another example of the present invention, the demography of users includes truck drivers and other long distance drivers. In yet another example of the present invention, the demography of users includes short distance drivers.

In one embodiment, the predetermined driving route can be one of a number of driver testing route that includes various driving tasks, such as: (1) Right Turns—Driver Required to Stop on Red Light, (2) Left Turns—No Oncoming or Cross Traffic, (3) Left Turns—Driver Must Negotiate Oncoming Traffic (unprotected turns), (4) Green Lights—Driver has Throughway, (5) Stop-Signs—Driver Required to Stop, (6) Reduction in Number of Lanes—Driver Required to Change Lane, (7) Pedestrians Jaywalking—Driver Required to Slow Speed to Avoid Collision, (8) Cars Pull into Path of Driver—Driver Required to Slow Speed to Avoid Collision, (9) Speed Limit Changes—Driver Needs to Change Speeds, and the like. Table I illustrates an example of the predetermined driving route that includes various driving tasks and the frequencies at which the driving tasks occur. At step 220, the predetermined driving route is displayed on display device 110. The user's decision in response to the driving tasks presented in the predetermined driving route is observed at step 230.

TABLE 1

Simulator Driving Maneuvers

| Driving Maneuver | Frequency |
|---|---|
| Right Turns-Driver Required to Stop on Red Light | 5 |
| Left Turns-No Oncoming or Cross Traffic | 2 |
| Left Turns-Driver Must Negotiate Oncoming Traffic (unprotected turns) | 5 |
| Green Lights-Driver has Throughway | 7 |
| Stop-Signs-Driver Required to Stop | 3 |
| Reduction in Number of Lanes-Driver Required to Change Lane | 2 |
| Pedestrians Jaywalking-Driver Required to Slow Speed to Avoid Collision | 2 |
| Cars Pull into Path of Driver-Driver Required to Slow Speed to Avoid Collision | 3 |
| Speed Limit Changes-Driver Needs to Change Speeds | 13 |

At decision step 240, control device 130 determines if the user made a correct decision in comparison to the required decision by the driving task presented in the predetermined driving route. In an example of the present invention, the control device 130 performance errors of user driving actions in comparison to the actions required by the driving tasks are determined. In an example of the present invention, the performance errors include Level 1 errors (e.g., hazardous errors), Level 2 errors (e.g., traffic violations), Level 3 errors (e.g., rule violations), and the like. Exemplary hazardous errors include crash involving pedestrian, crash involving building, crash involving vehicle, driving in the lane of oncoming traffic, turning from the wrong lane, unable to maintain lane position, and the like. Exemplary traffic violations include running red light, running stop sign, speeding, driving at a speed of at least 10 miles per hour less than the posted speed limit, stopping without reason, straddling lane for at least 6 seconds, and the like. Exemplary rule violations include failing to turn, turning in direction opposite of command, poor control of vehicle during divided attention task, and the like. Table 2 illustrates an example of performance errors of a user while executing a driving task presented in the predetermined driving route. If the user decision is incorrect, performance error is stored at step 250. If the user decision is correct, then, at decision step 260, the simulator determines if the user has performed the last driving task in the predetermined driving route. If the user has not performed the last driving task, then, at step 220, display corresponding to the user's position in the predetermined driving route is updated.

TABLE 2

Performance errors of a user

| Level 1 Errors | Level 2 Errors | Level 3 Errors |
|---|---|---|
| Crash (involving pedestrian, building or vehicle) | Running red light or stop sign | Failing to turn |
| Driving in the lane of oncoming traffic | Speeding | Turning in direction opposite of command |
| Turning from the wrong lane | Driving too slow (10 MPH or more < posted speed limit | Poor control of vehicle during divided attention task |
| Unable to maintain lane position | Stopping without reason | |
| | Straddling lane >6 seconds | |

If the user has performed the last driving task, then, at step 270, performance errors are compared to at least one threshold value. In an example of the present invention, the threshold values include at least one hazardous error, at least two traffic violations, and at least one rule violations and at least one traffic violations. At step 280, user driving performance outcome is scored based on the comparison of the performance errors with the threshold values and the score is displayed at the completion of all driving tasks in the predetermined driving route. The score indicates the driving capabilities of a user in a simulated environment when presented with various driving tasks for a predetermined time period. In an example of the present invention, the score is displayed as pass or fail. In an example of the present invention, the score is displayed (and/or reported) as pass with restrictions. In particular, a user can pass with restrictions based on the number of errors the user makes and/or user's clinical information such as information relating to medications, if any, the user has been taking. In yet another example of the present invention, the score is reported as a detailed report. A report could be used in a subsequent evaluation for fitness to drive. In another example, the invention would be helpful in rehab situations to assess driving ability to determine when patients would be able to resume driving. For example, the invention would be helpful in rehab situations to assess driving ability of patients who may suffer from temporary loss or impairment of proprioception after having undergone total hip or total knee replacement surgery, and patients who may have difficulty applying correct amount of force on pedals in a vehicle after having undergone total hip or total knee replacement surgery or have suffered at least one stroke. In another example, the invention could be helpful in rehab situations to assess driving ability of patients who may suffer from cognitive impairments from vascular events after having undergone coronary artery bypass surgery. In yet another example, the invention would be helpful in rehab situations to assess driving ability of patients who may suffer from impaired memory and orientation, limitations of concentration, planning and judgment as a result of dementia. Table 3 illustrates an example of a form for detailed report that includes elements of the predetermined driving route that are necessary to conduct the assessment of driving fitness of a driver.

TABLE 3

Report of an assessment of driving fitness of a driver in a predetermined driving route

| | | Insight (How well compared to others your own age) | A lot better | Little better | Same | Little worse | A lot better | | Name Date | | |
|---|---|---|---|---|---|---|---|---|---|---|---|
| | | (25 mph) First int. with stop sign, no turn (RR?) | YES | NO | V/P | P/A | | DWL | Straddle | Ticket | Crash |
| | | (35 mph) Curve to the left in neighborhood | YES | NO | V/P | P/A | | DWL | Straddle | Ticket | Crash |
| | | (45 mph) | YES | NO | V/P | P/A | | DWL | Straddle | Ticket | Crash |
| | | (35 mph) Lane widens to 4 & neighborhood comes in | YES | NO | V/P | P/A | | DWL | Straddle | Ticket | Crash |
| X | | DA & city pops up | YES | NO | V/P | P/A | | DWL | Straddle | Ticket | Crash |
| X | | 3rd int. in Big Sample City- left (W N) | YES | NO | V/P | P/A | TWL | | | Ticket | Crash |
| | | (25 mph) houses on both sides | YES | NO | V/P | P/A | | DWL | Straddle | Ticket | Crash |
| X | | Right turn at stop light, | YES | NO | V/P | P/A | TWL | | | Ticket | Crash |
| X | | light changes (W N) (RR?) | | | | | | | | | |

TABLE 3-continued

Report of an assessment of driving fitness of a driver in a predetermined driving route

| | Insight (How well compared to others your own age) | A lot better | Little better | Same | Little worse | A lot better | | Name Date | | |
|---|---|---|---|---|---|---|---|---|---|---|
| X | Pedestrian sign and Pedestrians | YES | NO | V/P | P/A | | DWL | Straddle | Ticket | Crash |
| | (35 mph) | YES | NO | V/P | P/A | | DWL | Straddle | Ticket | Crash |
| X | Light changes, no turns, 4-way int. (RR?) | YES | NO | V/P | P/A | | DWL | Straddle | Ticket | Crash |
| X | 4-way int., left turn, car stream (W N) | YES | NO | V/P | P/A | TWL | | | Ticket | Crash |
| X | Light changes, right (RR?) | YES | NO | V/P | P/A | TWL | | | Ticket | Crash |
| X | DA | YES | NO | V/P | P/A | | DWL | Straddle | Ticket | Crash |
| | (35 mph) Barrels, road narrows sign | YES | NO | V/P | P/A | | DWL | Straddle | Ticket | Crash |
| X | 4-way int., no turns | YES | NO | V/P | P/A | | DWL | Straddle | Ticket | Crash |
| X | Left curve | YES | NO | V/P | P/A | | DWL | Straddle | Ticket | Crash |
| | (45 mph) City comes up | YES | NO | V/P | P/A | | DWL | Straddle | Ticket | Crash |
| X | 4-way int., left turn (W N) | YES | NO | V/P | P/A | TWL | | | Ticket | Crash |
| X | Left curve | YES | NO | V/P | P/A | | DWL | Straddle | Ticket | Crash |
| X | Road widens to 4 lanes | YES | NO | V/P | P/A | | DWL | Straddle | Ticket | Crash |
| X | 4-way stop sign, 2 blue trucks | YES | NO | V/P | P/A | TWL | | | Ticket | Crash |
| X | approach, right turn(RR?) | | | | | | | | | |
| X | Pedestrian with blue pick-up | YES | NO | V/P | P/A | | DWL | Straddle | Ticket | Crash |
| X | Car pulls out of house | YES | NO | V/P | P/A | | DWL | Straddle | Ticket | Crash |
| X | Car pulls out of gas station | YES | NO | V/P | P/A | | DWL | Straddle | Ticket | Crash |
| X | DA | YES | NO | V/P | P/A | | DWL | Straddle | Ticket | Crash |
| | (35 mph) | YES | NO | V/P | P/A | | DWL | Straddle | Ticket | Crash |
| | (25 mph) City comes in | YES | NO | V/P | P/A | | DWL | Straddle | Ticket | Crash |
| X | 4-way int., car stream, left turn (W N) | YES | NO | V/P | P/A | TWL | | | Ticket | Crash |
| X | 4-way int., light changes, right turn (W N) (RR?) | YES | NO | V/P | P/A | TWL | | | Ticket | Crash |
| | (45 mph) | YES | NO | V/P | P/A | | DWL | Straddle | Ticket | Crash |
| X | car pulls out of gas station | YES | NO | V/P | P/A | | DWL | Straddle | Ticket | Crash |
| X | 4-way int., car stream, left turn (W N) | YES | NO | V/P | P/A | TWL | | | Ticket | Crash |
| X | 4-way int., light changes, no turns (RR?) | YES | NO | V/P | P/A | | DWL | Straddle | Ticket | Crash |
| | (25 mph) | YES | NO | V/P | P/A | | DWL | Straddle | Ticket | Crash |
| X | 4-way int., stop sign, | YES | NO | V/P | P/A | TWL | | | Ticket | Crash |
| X | pedestrians, right turn (W N) (RR?) | | | | | | | | | |

TABLE 3-continued

Report of an assessment of driving fitness of a driver in a predetermined driving route

| | Insight (How well compared to others your own age) | A lot better | Little better | Same | Little worse | A lot better | | | Name Date | | |
|---|---|---|---|---|---|---|---|---|---|---|---|
| X | Left curve | YES | NO | V/P | P/A | | DWL | Straddle | Ticket | Crash |
| X | Left DA, lane narrows | YES | NO | V/P | P/A | | DWL | Straddle | Ticket | Crash |
| | (45 mph) Barrels | YES | NO | V/P | P/A | | DWL | Straddle | Ticket | Crash |
| X | 4-way int., no turns | YES | NO | V/P | P/A | | DWL | Straddle | Ticket | Crash |
| X | 4-way int., left turn (W N) | YES | NO | V/P | P/A | TWL | | | Ticket | Crash |
| X | 4-way int., car stream, left turn (W N) | YES | NO | V/P | P/A | TWL | | | Ticket | Crash |
| X | 4-way int., light changes, no turns (RR?) | YES | NO | V/P | P/A | | DWL | Straddle | Ticket | Crash |
| X | 4-way int., car stream, right turn (W N) (RR?) | YES | NO | V/P | P/A | TWL | | | Ticket | Crash |
| X | 4-way int., light changes, no turns (RR?) | YES | NO | V/P | P/A | | DWL | Straddle | Ticket | Crash |
| X | 4-way int., car stream, left turn (W N) | YES | NO | V/P | P/A | TWL | | | Ticket | Crash |
| X | 4-way int., right turn (W N) (RR?) | YES | NO | V/P | P/A | TWL | | | Ticket | Crash |
| | (25 mph) | YES | NO | V/P | P/A | | DWL | Straddle | Ticket | Crash |
| X | Pedal problems? | YES | NO | V/P | P/A | | | | | |
| X | Insight (How well compared to others your own age) | A lot better | Little better | Same | Little worse | | | | | |

Figure 3:
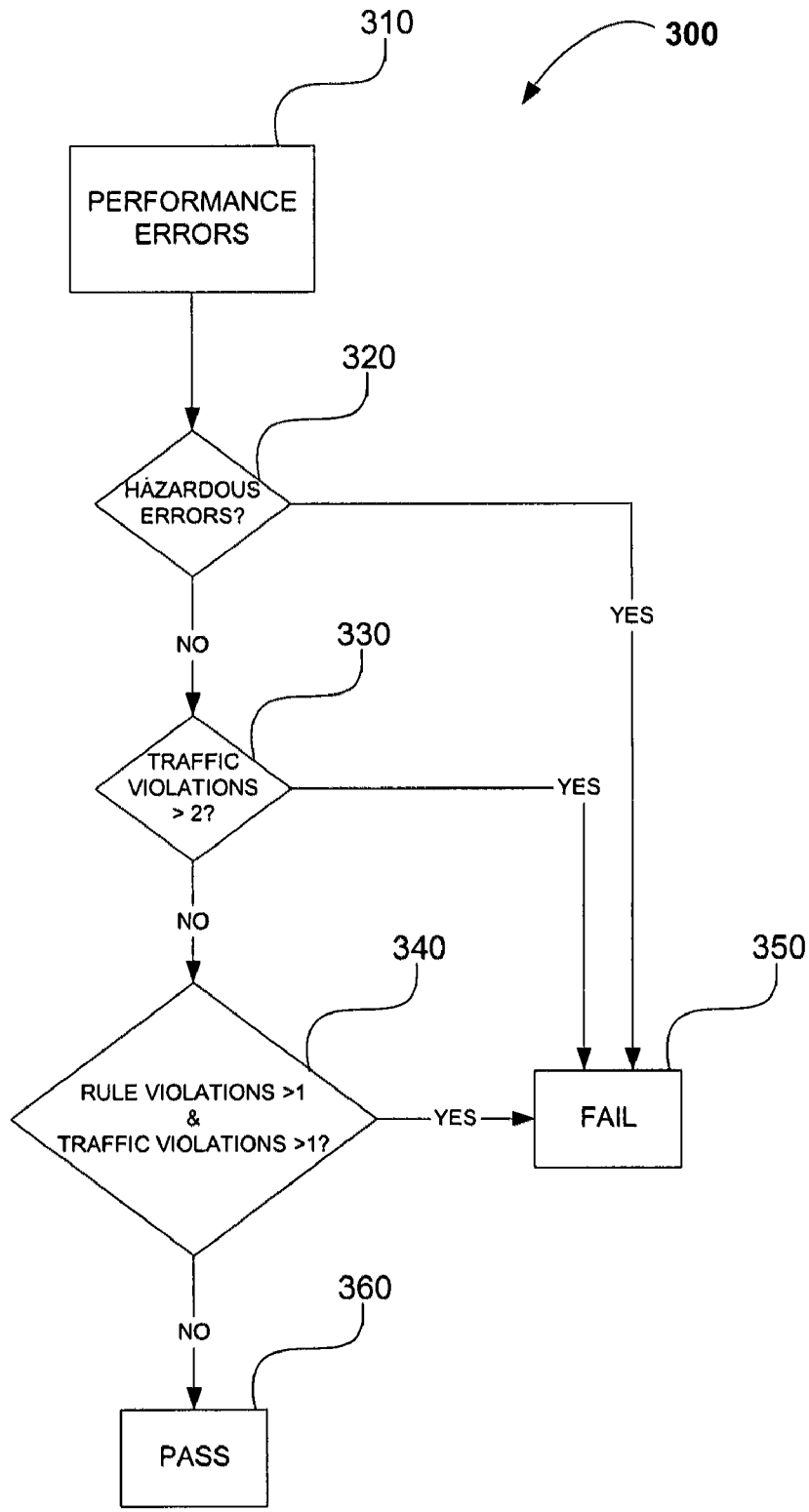
FIG. 3. is a flow chart illustrating a method of scoring driving performance outcome in accordance with various embodiment of the present invention.

FIG. 3, generally at 300, illustrates an exemplary method of scoring driving performance outcome in accordance with an embodiment of the present invention. At step 310, comparator 140 receives performance errors from control device 130. At decision step 320, comparator 140 determines if at least one performance error is a hazardous error. If at least one performance error is a hazardous error, the driving performance outcome of the user is scored as fail. If at least one performance error is not a hazardous error, then, at decision step 330, comparator 140 determines if the performance errors are at least two traffic violations. If the performance errors are at least two traffic violations, the driving performance outcome of the user is scored as fail. If the performance errors are not at least two traffic violations then, at decision step 340, comparator 140 determines if the performance errors are at least one rule violation and at least one traffic violation. If the performance errors are at least one rule violation and at least one traffic violation, the driving performance outcome of the user is scored as fail. If the performance errors are at least one rule violation and at least one traffic violation, then, at step 360, the driving performance outcome of the user is scored as pass.

At least one embodiment of the present invention employs a mixed methodology, using qualitative analysis of driving recommendation notes, a descriptive analysis of restricted drivers, and a quantitative comparison of older drivers on key indicators of driving fitness. Another embodiment of the present invention employs a mixed methodology, using medical history and demographics, qualitative analysis of driving recommendation notes, a descriptive analysis of restricted drivers, and a quantitative comparison of older drivers on key indicators of driving fitness. In one embodiment, key indicators include outcomes of five neuropsychological tests and the total number of hazardous errors committed during the simulated drive. Exemplary neuropsychological tests include clock drawing test (CDT), Folstein mini-mental status exam (MMSE), Trailmaking parts A and B, the geriatric depression scale (GDS), and the like. In a method in accordance with at least one embodiment of the present invention, for each of the six indicators, safe drivers will score the best, unsafe drivers will score the worst, and restricted drivers will score between these two groups.

Figure 4:
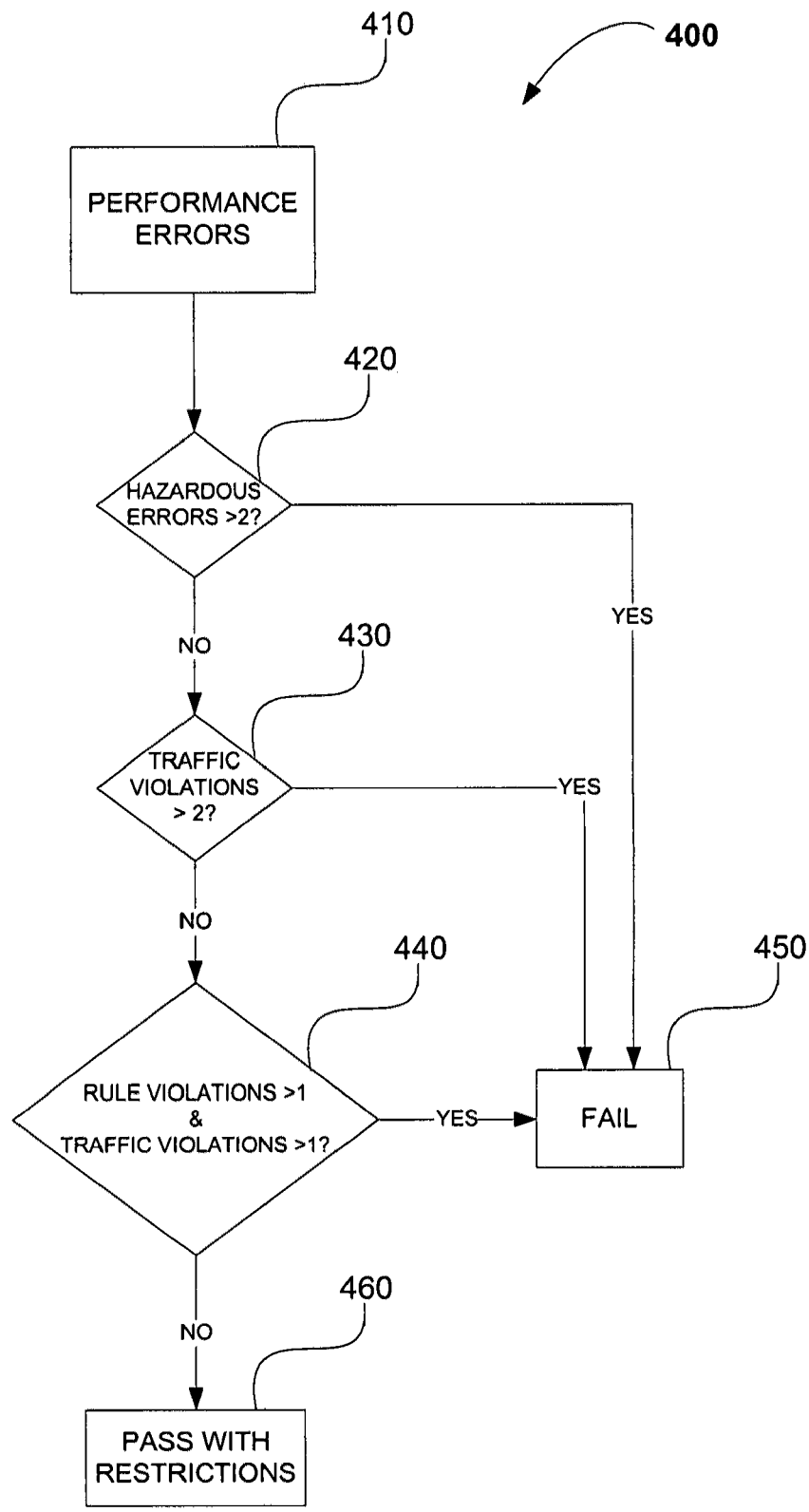
FIG. 4. is a flow chart illustrating another method of scoring driving performance outcome in accordance with various embodiment of the present invention.

FIG. 4, generally at 400, illustrates another exemplary method of scoring driving performance outcome in accordance with an embodiment of the present invention. At step 410, comparator 140 receives performance errors from control device 130. At decision step 420, comparator 140 determines if at least two performance errors are hazardous errors. If at least two performance errors are hazardous errors, the driving performance outcome of the user is scored as fail. If at least two performance errors are not hazardous errors, then, at decision step 430, comparator 140 determines if the performance errors are at least two traffic violations. If the performance errors are at least two traffic violations, the driving performance outcome of the user is scored as fail. If the performance errors are not at least two traffic violations then, at decision step 440, comparator 140 determines if the performance errors are at least one rule violation and at least one traffic violation. If the performance errors are at least one rule violation and at least one traffic violation, the driving performance outcome of the user is scored as fail. If the performance errors are at least one rule violation and at least one traffic violation, then, at step 460, the driving performance outcome of the user is scored as pass with restrictions. In an example of the present invention, types of restrictions are determined based on severity of errors, length of driving time before any errors, and patients ability to avoid repeating the error.

In one embodiment of the present invention, a driving performance outcome of pass with restrictions is selected from error specific restriction categories. Exemplary restriction categories include limited driving, reevaluation, co-pilot, environmental restrictions, retraining/equipment needs, and the like. Table 4 illustrates an example of error specific driving restrictions.

TABLE 4

Error specific driving restrictions.

| Restriction Category | Example of restriction | Example of specific error |
|---|---|---|
| Limited driving | Limit driving distance to familiar areas | Inappropriate DA task response; fails to turn |
| | Limit driving time due to fatigue | Commits lower level error (traffic/rule violations) after 20 min or more of error-free driving |
| Reevaluation | Discontinue driving until medication adjustment and reevaluation | Any driving error along with new medication |
| | Discontinue driving until medical follow-up and reevaluation | Any error along with positive screen for depression or cognitive impairment |
| Co-pilot | Navigator for unfamiliar areas | Unable to recall response for DA tasks; fails to turn |
| Environmental restrictions | Daytime only | Requires prompt to visually search low contrast targets |
| | Use traffic for speed cues | Difficulty maintaining speed in absence of traffic |
| Retraining/equipment needs | Adaptive equipment needed | Poor steering wheel grip |
| | Gradually increase driving exposure | No errors; history of driving cessation >6 months |

DA: Divided attention.

In another embodiment of the present invention, hazardous errors include unintended accelerations. Unintended acceleration (UA) is defined as an inadvertent, unexpected, high-power acceleration from a stationary position or a very low initial speed that involves the unintentional pressing of the accelerator instead of, or in addition to, the brake pedal. In one example, UA occurs at higher speeds when the driver is presented with an unexpected situation requiring rapid decision-making. Exemplary unexpected situation requiring rapid decision-making include sudden appearance of a pedestrian or car in the driver's path and in which the accelerator is pressed rather than the brake pedal.

EXAMPLES

A more complete understanding of the present invention can be obtained by referring to the following illustrative examples of the practice of the invention, which examples are not intended, however, to unduly limit the present invention.

Example 1

Error Specific Restrictions for Older Drivers

In the following illustrative example, participants at the driving clinic included referrals from physicians, family, friends or the department of motor vehicles (DMV). A small number of patients were self-referred. The sample included 108 men and women evaluated for driving competence. Inclusion criteria required drivers to complete a sufficient portion (80%) of the driving evaluation such that a driving outcome could be determined, they were required to be age 60 or older, and were required to possess a current valid driver's license. All eligible subjects provided informed consent allowing data to be used for research purposes and were included in this study. The institutional review board (IRB) for human subjects protection at Eastern Virginia Medical School approved the study.

Measures

All subjects completed a medical history and demographic questionnaire, the clock drawing test (CDT), the Folstein mini-mental status exam (MMSE), Trailmaking parts A and B, the geriatric depression scale (GDS), and a simulated driving test. All neuropsychological tests were scored independently by an experienced research associate blinded to driving simulation test results. Driving simulation was evaluated by the principal investigator who was blinded to all neuropsychological testing. The driving evaluation outcome of safe, restricted or unsafe was also determined by the principal investigator unblinded to medical history, neuropsychological test results, and the simulated drive.

Driving Simulation Performance

Driving performance was tested utilizing a STISIM Drive™ simulator (Systems Technology, Inc., Hawthorne, Calif.). The STISIM Drive™ correlates with on-road testing. Simulation approximates real world driving and provides a safe, cost effective environment for mimicking driving tasks. While not exactly the same 'feel' as real world driving, high fidelity driving simulation, across a range of technological sophistication is a sensitive method to evaluate driving performance. Driving simulation allows for evaluation of risky situations that would be unsafe to duplicate in on-road testing. As an interactive system, it responds to driver inputs (e.g., steering, throttle, and brake) and generates realistic roadway images in real-time. The fixed base driving cab has an adjustable car seat, accelerator and brake pedals, and dash with standard size steering wheel. Three ceiling mounted Epson 700c projectors display roadway images on three contiguous 4×8 ft screens, providing a 135° field of view.

Participants in this study were familiarized with the simulator through a ten-minute practice session. This ten-minute warm-up provided ample time for driver acclimation. Instructions and review of traffic rules were presented prior to the practice and test sessions. For the test situation, subjects were instructed to drive through an urban course designed to take approximately 30 min. This course required driver execution of maneuvers, which demonstrate the ability to drive and emphasize conditions revealing discriminating errors, including unprotected left turns and navigation through stop sign controlled intersections. The course also presented speed limit variations, right and left turns, traffic lights, and vehicular and pedestrian traffic. Over the course of the drive the simulator recorded divided attention sequences, response times, and correct and missed responses. Performance measures included hazardous errors, traffic violations, and rule violations. Hazardous errors include crashes, running red lights, lane position errors, and turning positioning errors.

Determinations of restricted and unsafe outcomes were based on the presence and quality of hazardous errors and traffic or rule violations. While there was some overlap in number and types of errors, the determinations were based on severity of the errors, the length of time driving before any errors occurred, and the patients' ability to learn from the error (i.e. that particular error was not repeated). Performance on the neuropsychological tests was also instructive in establishing a propensity for certain error types.

Qualitative Analysis

Specific driving recommendations and restrictions were orally communicated to patients and their caregivers at the conclusion of the evaluation. A written report was mailed to the patient and his/her physician within the following week. The text documenting the restrictions provided the raw data for qualitative analysis. In order to generate a codebook of driver restrictions two independent raters coded patient recommendation notes for major themes. The two raters had an agreement rate exceeding 90%. Once the codebook was completed, a third independent rater coded each restricted patient with the appropriate combination of restrictions for data entry. All data were entered and cleaned in Microsoft Access prior to exportation to SPSS 12.0 (SPSS, Inc., Chicago, Ill.) for further analysis.

Statistical Analysis

Unsafe, safe, and restricted older drivers were compared on demographic variables and key indicators of driving fitness. Demographic comparisons for age and years of education were analyzed using one-way Anova(s). Gender and level of educational attainment were analyzed with chi-square test and Kruskal-Wallis test for nonparametric comparisons with nominal and ordinal level data, respectively. A one-way Anova was selected as a parsimonious choice for the primary statistical analysis due to the scale level of measurement for all the key predictor variables and the nominal level of measurement for the driving outcome. In order to verify the three driving outcome groups, a one-way Anova was performed to test for differences in mean scores on CDT, MMSE, GDS, Trail-making A and B, and the total hazardous errors. Raw MMSE and Trailmaking scores were used in all analyses in order to maintain a scale level of measurement rather than collapsing the data to ordinal or nominal scores based on population norms. Tukey's test was used for post hoc comparisons of individual means and to isolate differences within significant results from the overall model. All statistical tests were conducted with a 95% confidence interval.

Results

Driving evaluation of the 108 subjects identified 47 unsafe, 35 safe, and 26 restricted drivers. Descriptive statistics on demographic and test variables for each group are presented in Table 5. Variations in sample sizes by group for the study variables presented in Table 5 indicate missing data with the exception of scores for Trailmaking A and B. Lower sample sizes on the Trailmaking variables indicate the exclusion of data from patients who abandoned the task. These scores were omitted as outliers without real values in order to avoid inflated descriptive statistics (e.g., only 21 of 47 unsafe drivers completed Trailmaking B to provide a meaningful score).

Among restricted drivers, the resultant list of 29 unique recommendations or restrictions was organized into five thematic categories: limited driving, reevaluation, co-piloting, environmental restrictions, and retraining/equipment needs. Descriptive statistics and examples of each category are provided in Table 4.

TABLE 5

Mean, standard deviation, and range values for demographic and evaluation variables

| | Safe (N = 35) | | | | Restricted (N = 26) | | | | Unsafe (N = 47) | | | |
|---|---|---|---|---|---|---|---|---|---|---|---|---|
| | N | M | S.D. | Range | N | M | S.D. | Range | N | M | S.D. | Range |
| Demographics | | | | | | | | | | | | |
| Age | 35 | 77.63 | 6.62 | (62-86) | 26 | 78.06 | 8.64 | (60-99) | 47 | 76.98 | 7.60 | (62-97) |
| Education (in years) | 32 | 14.31 | 2.28 | (10-20) | 22 | 13.82 | 2.15 | (12-20) | 41 | 13.68 | 3.50 | (5-20) |
| Gender | | | | | | | | | | | | |
| Male | 23 | — | — | — | 14 | — | — | — | 27 | — | — | — |
| Female | 12 | — | — | — | 12 | — | — | — | 20 | — | — | — |
| Evaluation variables | | | | | | | | | | | | |
| CDTa,*** | 34 | 6.09 | 0.97 | (4-7) | 25 | 5.32 | 1.41 | (2-7) | 42 | 3.71 | 1.60 | (0-7) |
| GDS$^a$ | 35 | 6.60 | 4.07 | (0-16) | 26 | 5.58 | 4.12 | (0-19) | 47 | 6.53 | 5.30 | (0-19) |
| MMSE$^a$*** | 35 | 27.66 | 3.11 | (19-30) | 25 | 26.84 | 2.85 | (19-30) | 47 | 24.09 | 4.31 | (15-30) |
| Trailmaking A (sec.) | 35 | 73.00 | 84.4 | (26-300)$^b$ | 26 | 80.50 | 68.07 | (23-300)$^c$ | 47 | 102.57 | 63.41 | (36-300)$^b$ |
| Trailmaking B (sec.)*** | 35 | 120.40 | 63.72 | (62-300)$^b$ | 26 | 189.31 | 80.95 | (62-300)$^c$ | 47 | 260.32 | 63.69 | (93-300)$^b$ |
| Total hazardous errors*** | 34 | 0.06 | 0.24 | (0-1) | 26 | 1.12 | 1.61 | (0-5) | 40 | 5.38 | 4.11 | (0-17) |

N = Number of participants with complete information on variable; M, mean; S.D., standard deviation.
$^a$Possible ranges: CDT (0-7); GDS (0-30); MMSE (0-30).
$^b$A score of 300 on Trailmaking A or B indicates that the patient was unable to complete the task in five minutes or less.
***$p < .001$.

A maximum of six restrictions was given to a single patient.

Figure 5:
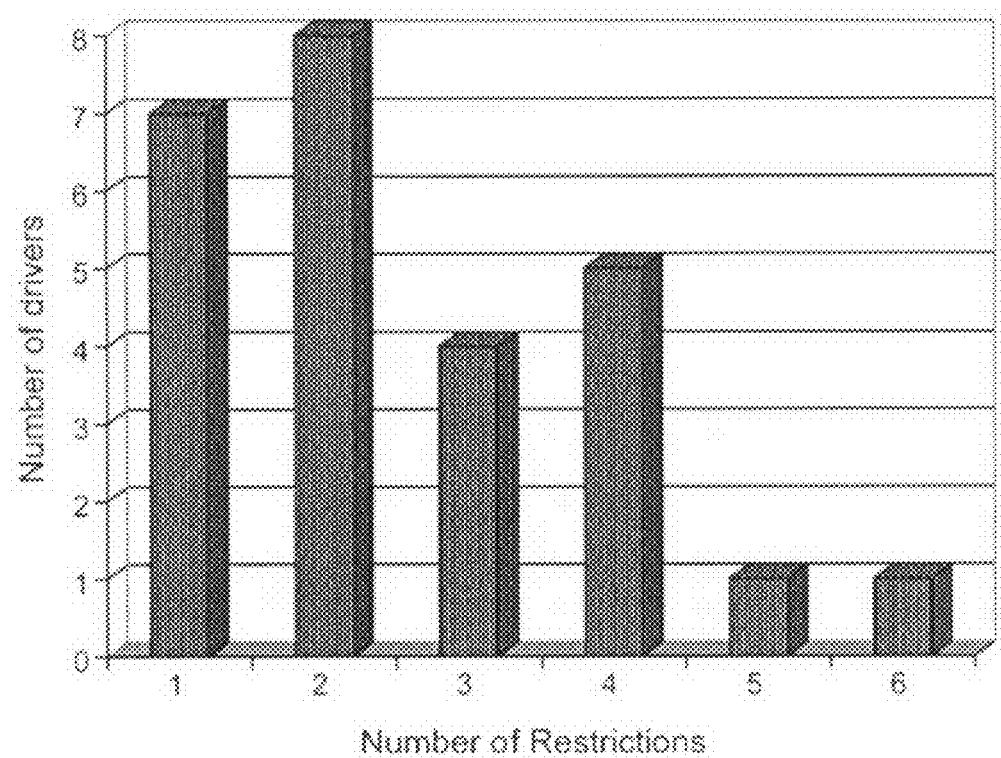
FIG. 5. illustrates distribution of restricted drivers by number of restrictions.

FIG. 5 presents the distribution of restrictions. The three most common individual restrictions were limited driving distance (N=8), limited driving time (N=8), and daytime only driving (N=8).

Safe, restricted, and unsafe drivers did not differ on either gender composition ($\chi^2$=0.984, df=2, p=0.612) or level of educational attainment (H=0.875, df=2, p=0.646). When testing for differences in mean scores for the variables of interest (age, CDT, GDS, MMSE, total number of hazardous errors, Trailmaking Parts A and B, and year of education), only four variables differed by driving outcome (safe, restricted or unsafe): MMSE (F[2,104]=10.75, p<0.001), Trailmaking B (F[2,76]=9.96, p<0.001), CDT (F[2,98]=29.88, p<0.001), and the total number of hazardous errors (F[2,97]=39.06, p<0.001). There were no significant differences between groups on GDS (p=0.644), Trailmaking A (p=0.903), years of education (p=0.633), or age (p=0.832). Additional analyses were not conducted for GDS and Trailmaking A since the overall model did not support the hypotheses regarding group differences.

Post Hoc Testing

Tukey's test was performed to examine multiple comparisons between the three driving outcome groups for the significant differences on MMSE, Trailmaking B, CDT, and total number of hazardous driving errors. Both safe and restricted drivers differed from unsafe drivers on MMSE (safe: p<0.001; restricted: p=0.008), CDT (ps<0.001), and the number of hazardous errors committed (ps<0.001). Safe and restricted drivers, however, did not differ from each other as expected on MMSE (p=0.668), CDT (p=0.088), or hazardous errors (p=0.303). Trailmaking B evidenced a different relationship. Restricted drivers required more time to complete the test than safe drivers (p=0.004) as expected, but contrary to our hypothesis, there were no significant differences in mean completion times between restricted and unsafe drivers (p=0.667).

Example 2

Pedal Errors Among Older Drivers

In the following illustrative example, 180 subjects aged 65 and older were recruited through driving evaluation clinics, referrals from physician practices, the department of motor vehicles, or self-referrals from the community. All recruited subjects were currently driving and held a valid driver's license. Subjects completed a 30-minute driving evaluation on a simulator as well as three cognitive tests, the Mini-Mental State Exam (MMSE), which is primarily a measure of attention and recall, the Clock Drawing Test (CDT), which measures multiple areas of cognitive function including comprehension, memory, visuospatial abilities, abstract thinking and executive function (Shulman, 2000) and Trailmaking Part A and B, a measure of attention and visual search. Clock drawing tests were scored using our seven point scoring scale, as it is strongly associated with driving performance and correlates highly with other scoring methods (Freund et al., 2005). Scores were categorized as impaired (0-4 points), borderline (5 points), and within normal limits (6-7 points). Clock drawing tests were assessed independently and blind to driving simulation test results.

Driving performance was tested utilizing a STISIM Drive™ simulator (Systems Technology, Inc., Hawthorne, Calif.) (FIG. 1). Driving simulation approximates real world driving and is a sensitive method of evaluating driving performance. Simulation approximates real world driving and provides a safe, cost effective environment for mimicking driving tasks. High fidelity driving simulation, across a range of technological sophistication, is a sensitive method to evaluate driving performance. Driving simulation allows for evaluation of risky situations that would be unsafe to duplicate in on-road testing.

The STISIM Drive correlates with on-road testing. For example, correlations were demonstrated in lane and turning position errors, decision-making errors (e.g., gap choice), and response to traffic lights. As an interactive system, STISIM Drive is responsive to driver inputs (steering, throttle, brake) and generates realistic roadway images in real-time. The fixed base driving cab is built to industry standard with an adjustable car seat and seatbelt, accelerator and brake pedals, and dash with standard size steering wheel. Three ceiling mounted Epson 700c projectors display roadway images on three contiguous 4×8 ft screens, providing a 135° field of view.

Participants were familiarized with the simulator during a ten-minute practice session, which in our experience is ample time for acclimation and which is well within the ranges reported in other studies (McGehee et al, 2004; Rizzo et al, 2001; Uc et al, 2006). Instructions and review of traffic rules were presented prior to the practice and test sessions. For the actual test, subjects were instructed to drive as they normally would in their own vehicles through an urban course (approximately 30 minutes), programmed to require execution of maneuvers encountered in everyday driving (e.g., changing traffic lights, directional turns, interacting vehicular and pedestrian traffic) and including those known to be difficult for older drivers (e.g., unprotected left turns, stop sign controlled intersections). The course includes 3 stop signs, 8 left turns (all unprotected), 7 right turns, 5 red lights and 1 green light where the subject is instructed to proceed without turning.

For this study, UA events were operationally defined as an inappropriate acceleration or failure to decelerate when deceleration or transition from accelerating to braking is required by a simulated driving demand (e.g., stop sign, vehicular intrusion, pedestrian intrusion). Data were collected as simple error counts. Yellow light stimuli were not counted in the UA scenarios since some drivers intentionally accelerate to avoid being caught at a red light. In the simulated environment, all motion is forward such that there are no reverse motion or "backing up" tasks.

The relationship between UA events and the short battery of neuropsychological tests (CDT, MMSE, and Trails A & B) were examined using binary logistic regression. After the data were collected and checked for completeness and quality, an extensive descriptive and exploratory analysis was completed. Predictors were assessed for distributional assumptions and the relationship between predictors and the dichotomous outcome were evaluated. In addition to descriptive statistics and univariate plots, the analysis included density plots of continuous variables and plotting of predictor-outcome relationships to guide inclusion of continuous variables in models as continuous or categorized into an appropriate number of indicator variables. All analyses were conducted using SAS v 9.1 (SAS Institute, Cary, N.C.).

Results

The sample consisted of 180 subjects (4 subjects had missing data and were excluded from the analysis), aged 65-89, with a mean age of 76. Of the 176 subjects 62.5% were male and nearly 64% of the participants had greater than a high school education. Table 6 displays the demographic characteristics of the study participants, as well as presence or absence of UA events. Based on MMSE scores, subjects in this study could be considered normal to moderately cognitively impaired (mean MMSE 25.18, Range 14-30).

TABLE 6

Demographic characteristics of the study participants

| | Unintended Acceleration | | | | | |
|---|---|---|---|---|---|---|
| | | | Yes | | No | |
| | n | % | n | % | n | % |
| Age | | | | | | |
| 65 to 72 | 51 | 28.9 | 5 | 9.8 | 46 | 90.2 |
| 73 to 79 | 45 | 25.6 | 13 | 28.9 | 32 | 71.1 |
| 80 to 83 | 45 | 25.6 | 17 | 37.8 | 28 | 62.2 |
| 84 to 89 | 35 | 19.9 | 17 | 48.6 | 18 | 51.4 |
| | 176 | | 52 | | 124 | |
| Gender | | | | | | |
| Female | 66 | 37.5 | 20 | 30.3 | 46 | 69.7 |
| Male | 110 | 62.5 | 32 | 29.1 | 78 | 70.9 |
| | 176 | | 52 | | 124 | |
| Education | | | | | | |
| ≦ High School | 62 | 35.2 | 23 | 37.1 | 39 | 62.9 |
| Some College | 43 | 24.4 | 14 | 32.6 | 29 | 67.4 |
| College Graduate | 43 | 24.4 | 8 | 18.6 | 35 | 81.4 |
| College + | 28 | 16.0 | 7 | 25.0 | 21 | 75.0 |
| | 176 | | 52 | | 124 | |

Figure 6:
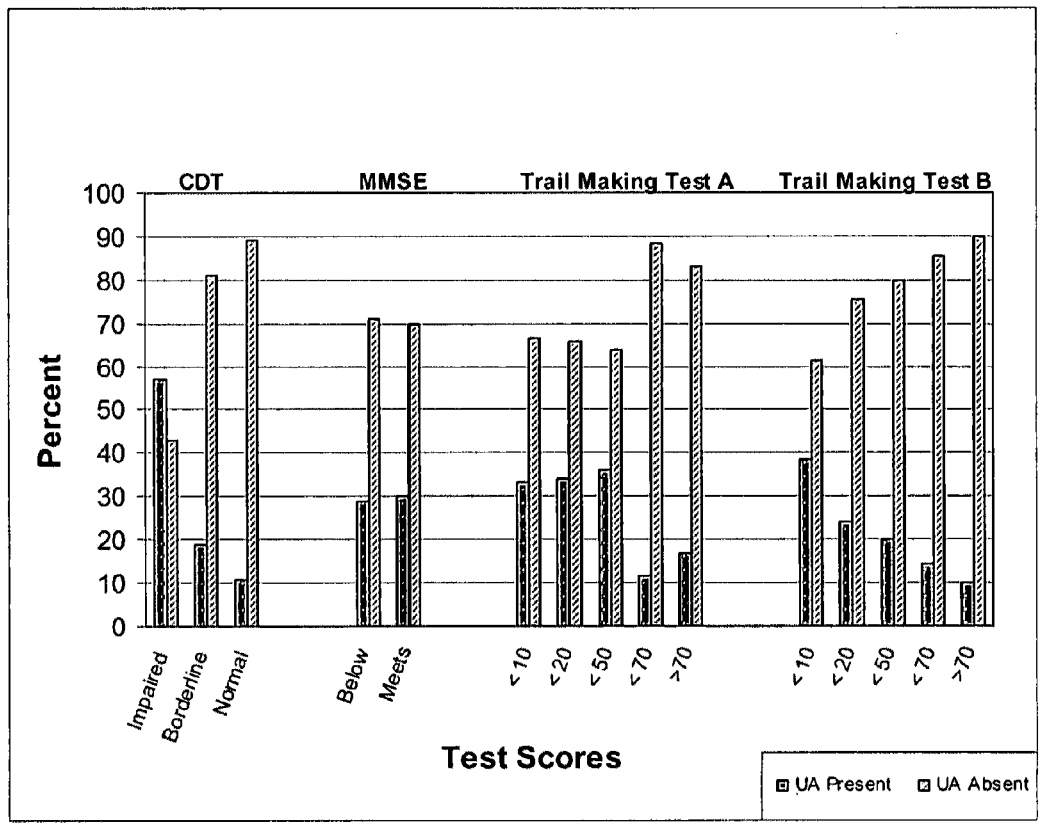
FIG. 6. illustrates drivers with unintended acceleration by neuropsychological tests.

Approximately one third of drivers experienced UA, 70% of whom verbalized their inability to slow or stop the vehicle. The number of UA incidents per driver ranged from 1 to 11, with an average of 2.55 events. Among these drivers, two thirds (69.2%) had CDT scores indicating cognitive impairment sufficient to impair driving performance (scores of 4 or below) and 17.3% had a borderline CDT score (Table 7). Among these same drivers, more than half (57.7%) scored at or above their age/education adjusted cut point for impairment on the MMSE (FIG. 6). Clock Drawing (lower CDT scores=lower cognitive function) was the best predictor of pedal errors (odds ratio=10.04, p<0.0001, 95% CI: 3.80, 26.63) such that subjects with clock drawing scores indicating impaired cognitive functioning were ten times as likely to experience UA than subjects with higher CDT scores (Table 3). In contrast, the MMSE did not predict UA events (odds ratio=0.53, 95% CI: 0.20, 1.42), suggesting that executive dysfunction in particular, measured by the CDT, may be an important contributor to UA and thus unsafe driving. While subjects scoring at or below 10% on Trailmaking Part B were 3 times as likely to experience UA than those with higher scores (odds ratio=3.23, 95% CI: 0.22, 48.07), this did not reach statistical significance. Similar results were observed in subjects scoring at or below 50% on Trailmaking Part A (odds ratio=3.42, 95% CI: 0.48, 24.41), however this did not reach statistical significance.

TABLE 7

Unintended acceleration (UA) and CDT outcome.

| | | | CDT | | | | |
|---|---|---|---|---|---|---|---|
| | | | Impaired | | Borderline | | Normal |
| | n | % | n | % | n | % | n | % |
| | | | UA | | | | | |
| Yes | 52 | 29.5 | 36 | 69.2 | 9 | 17.3 | 7 | 13.5 |
| No | 124 | 70.5 | 27 | 21.8 | 39 | 31.4 | 58 | 46.8 |
| | 176 | 100% | 63 | | 48 | | 65 | |

Age was also a significant predictor of UA (odds ratio=6.10, 95% CI: 1.77, 21.03) although only for the oldest drivers in the study, aged 84 and older (n=35). While those aged 73-79 were two times more likely (odds ratio=2.33, 95% CI: 0.69, 7.87) and those aged 80-83 were five times more likely (odds ratio 5.34, 95% CI: 1.61, 17.72) to have UA events, these did not reach statistical significance (Table 8). It is important to note, however, that age assignment to the 80-83 year old group may be predictive of UA, as the confidence interval suggests we cannot rule out an association (Table 8).

TABLE 8

Logistic Regression Analysis

| Variable | Odds Ratio | 95% CI |
|---|---|---|
| CDT | | |
| Impaired | 10.04† | 3.80-26.53 |
| Borderline | 1.69 | 0.56-5.12 |
| Normal* | — | — |
| Age | | |
| 65 to 72* | — | — |
| 73 to 79 | 2.33 | 0.69-7.87 |
| 80 to 83 | 5.34 | 1.61-17.72 |
| 84 to 89 | 6.10‡ | 1.77-21.03 |
| Gender | | |
| Male* | — | — |
| Female | 1.18 | 0.48-2.90 |
| MMSE | | |
| Below expectations (<age/education cutpoint) | 0.53 | 0.20-1.42 |
| Meet/exceeds expectations* (≧age/education cutpoint) | — | — |
| Trail A (Percentile) | | |
| ≦10 | 1.08 | 0.18-6.36 |
| ≦20 | 1.33 | 0.23-7.60 |
| ≦50 | 3.42 | 0.48-24.21 |
| ≦70 | 0.23 | 0.02-2.77 |
| >70* | — | — |
| Trail B (Percentile) | | |
| ≦10 | 3.23 | 0.22-48.07 |
| ≦20 | 1.12 | 0.06-19.86 |
| ≦50 | 1.92 | 0.12-31.11 |
| ≦70 | 0.61 | 0.02-17.00 |
| >70* | — | — |

*Denotes referent group
†Denotes significance at the p < .0001
‡Denotes significance at the p < .05

Clock Drawing Test

The CDT evaluates multiple cognitive domains including comprehension, memory, visuospatial abilities, abstract thinking, and executive function (Shulman, 2000). Inter-rater agreement for the CDT is high (0.97) and does not significantly differ between clinicians and non-clinicians. The CDT generally takes less than 5 min to administer and score. Subjects are verbally instructed to draw a clock, insert the numbers, and draw in the hands to set the time at ten minutes after eleven. The instructions are also written at the top of the page in 16-point Times New Roman font. Instructions may be repeated verbatim as needed, but cues are not permitted. Unprompted self-correction is allowed. CDTs are scored by the Freund method. Scores range from 0 to 7, with 7 being a perfect score.

Folstein Mini-Mental Status Exam (MMSE)

The Folstein MMSE is a clinical screening tool for cognitive impairment. It is relatively brief, requiring 5-15 min to administer depending on the patient's level of impairment. The 30 items assess orientation to time and place, attention and concentration, immediate and delayed recall, language, and constructional ability. The MMSE score is the summation of points for all correct answers with a maximum score of 30 points. Inter-rater reliability is moderate (>0.65). The MMSE shows modest to high correlations with other brief screening tests and measures of intelligence, memory, attention and concentration. However, rates of concordance between individual MMSE items and neuropsychological tests addressing corresponding cognitive domains are low.

Trailmaking Test Parts A and B

The Trailmaking test parts A and B assess working memory, speed of attention, sequencing, mental flexibility, visual search, and motor function. The test requires the subject to connect 25 encircled numbers (part A) and 25 alternating encircled numbers and letters (part B) in correct order. Administration takes approximately 5-10 min. Tests are scored as the time in seconds required for completion of the task. Studies have demonstrated an association between performance on Trailmaking part B, cognitive function, and driving performance. Observing the subject's ability to shift course during an ongoing activity (letters to numbers) and the ability to deal with more than one stimulus at a time (divided attention) may be of considerable value in the context of driving.

Geriatric Depression Scale (GDS)

The geriatric depression scale (GDS), also known as the mood assessment scale, screens for depression in the elderly. Depressed mood is an important consideration since depression is known to affect scores on tests of cognition. Thirty "yes/no" questions are self-administered as designed. One point is scored for each negative or depressive response, yielding a possible range from zero to 30. Reading assistance is permitted if requested by the patient.

Parts of the present invention and corresponding detailed description are presented in terms of software, computer programs, or algorithms. Software includes symbolic representations of operations or steps stored in the form of data bits within a computer memory. An algorithm is a sequence of steps leading to a desired result(s). The steps are those requiring physical manipulations of physical quantities. Usually, though not necessarily, these quantities take the form of optical, electrical, or magnetic signals capable of being stored, transferred, combined, compared, and otherwise manipulated. Unless specifically stated otherwise, or as is apparent from the discussion, terms such as "processing" or "determining" or the like refer to the actions and processes of a computer system, or similar electronic computing device, that manipulates and transforms data represented as physical, electronic quantities within the computer system's memories into other data similarly represented as physical quantities within the computer system's memories or registers or other such information storage, transmission or display devices.

Although the above detailed description has shown, described and pointed out fundamental novel features of the invention as applied to the various embodiments discussed above, it will be understood that various omissions and substitutions and changes in the form and details of the device illustrated may be made by those skilled in the art, without departing from the spirit and scope of the invention. The described embodiments are to be considered in all respects only as illustrative and not restrictive.

I claim:

1. A method of automatically evaluating driving capabilities of a user using a computer system in a simulated environment, the method comprising the steps of:
providing a driving route, selected from a plurality of driving routes, based on a demography associated with the user, wherein the selected driving route includes a plurality of predetermined driving tasks and a predetermined frequency at which the plurality of driving tasks occur;
recording performance errors of the user performing a simulated drive, wherein the simulated drive is performed on the selected driving route for a predetermined time period, and wherein the predetermined time period is based on the demography associated with the user;
comparing the performance errors to at least one threshold value to determine fitness to drive based on the performance errors; and
displaying outcome as pass with restrictions based on the comparison between the performance errors and the at least one threshold value.

2. The method according to claim 1, wherein the performance errors include hazardous errors, traffic violations, or rule violations.

3. The method according to claim 2, wherein the hazardous errors comprise crash involving pedestrian, crash involving building, crash involving vehicle, driving in the lane of oncoming traffic, turning from the wrong lane, unable to maintain lane position, and unintended acceleration.

4. The method according claim 2, wherein the traffic violations comprise running red light, running stop sign, speeding, driving at a speed of at least 10 miles per hour less than the posted speed limit, stopping without reason, and straddling lane for at least 6 seconds.

5. The method according claim 2, wherein the rule violations comprise failing to turn, turning in direction opposite of command, and poor control of vehicle during divided attention task.

6. The method according to claim 1, wherein the pass with restrictions include one or more of limited driving, reevaluation, co-pilot, environmental restrictions, and retraining/equipment needs.

7. The method according to claim 6, wherein the limited driving includes limit driving distance to familiar areas and limit driving time due to fatigue.

8. The method according to claim 6, wherein the reevaluation includes discontinue driving until medication adjustment/reevaluation and discontinue driving until medical follow-up and reevaluation.

9. The method according to claim 6, wherein the co-pilot includes a navigator for unfamiliar areas.

10. The method according to claim 6, wherein the environmental restrictions include daytime only and use traffic for speed cues.

11. The method according to claim 6, wherein the retraining/equipment needs include adaptive equipment needed and gradually increase driving exposure.

12. The method according to claim 1, further comprising the step of:
displaying performance outcome as fail if at least two performance errors are hazardous errors.

13. The method according to claim 1, further comprising the step of:
displaying performance outcome as fail if the performance errors are at least two traffic violations.

14. The method according to claim 1, further comprising the step of:
displaying performance outcome as fail if the performance errors are at least one rule violations and at least one traffic violations.

15. The method according to claim 1, wherein the driving tasks comprises stopping on red light when executing right turns, left turns when there is no oncoming or cross traffic, left turns when there is oncoming traffic, driver has throughway during green lights, driver required to stop at stop-signs, driver required to change lane when there is a reduction in number of lanes, driver required to slow speed to avoid collision when pedestrians are jaywalking, driver required to slow speed to avoid collision when cars pull into path of driver, and driver required to change speeds when speed limit changes.

16. The method according to claim 1, wherein the errors made by the user while performing the simulated drive are determined for at least 30 minutes.

17. The method according to claim 1, wherein the errors made by the user while performing the simulated drive are determined until the completion of the last driving task in the selected driving route.

18. The method according to claim 1, wherein the selected driving route includes at least one urban course.

19. The method according to claim 1, wherein the demography comprises 60 years or older.

20. The method of claim 1, wherein displaying the outcome as pass with restrictions based on the comparison includes displaying the outcome as pass with restrictions if the performance errors include at least one hazardous error, at least one traffic violation, or at least one rule violation.

21. The method of claim 20, wherein the types of restrictions are determined based on at least one of the severity of performance error, the length of driving time before any errors, and the user's ability to avoid repeating errors.

22. A system for automatically evaluating driving capabilities of a user in a simulated environment comprising:
a first display device configured to display a selected driving route for a predetermined time period, wherein the selected driving route includes a plurality of predetermined driving tasks and a predetermined frequency at with the plurality of driving tasks occur, and wherein the predetermined time period is based on a demography associated with the user;
a control device configured to provide the selected driving route, selected from a plurality of driving routes, based on the demography associated with the user and to observe simulated driving performance of the user on the selected driving route;
a storage device configured to store errors made by the user while performing the simulated drive;
a comparator configured to compare the performance errors to at least one threshold value to determine fitness to drive based on the performance errors; and a second display device, coupled to the comparator, configured to display the outcome as pass with restrictions based on the determination at the comparator.

23. The system according to claim 22, further comprising a plurality of input devices for controlling the position of a simulated vehicle in the simulated environment.

24. The system according to claim 22, wherein the input device comprises accelerator pedal, brake pedals, adjustable seats, throttle, dashboard, and steering wheel.

25. The system according to claim 22, wherein the display unit provides at least a 135 degree angle field of view.

26. The system according to claim 22, wherein the simulated environment is a driving cab.

27. The system according to claim 22, wherein the simulated environment comprises at least one desk, at least one chair, modular steering, modular dash, and at least one modular pedal.

28. The system according to claim 22, wherein the display unit comprises a ceiling mounted digital projector, and at least one screen.

29. The system according to claim 22, wherein the display unit comprises a computer monitor.

30. The system of claim 22, wherein the at least one threshold value includes at least one hazardous error, at least two traffic violations, or at least one rule violation and at least one traffic violation.

31. A non-tangible computer program product, residing on a computer-readable medium, the computer program product comprising computer instructions for configuring a computer to perform acts of automatically evaluating driving capabilities of a user, the acts comprising:
providing a driving route, selected from a plurality of driving routes, based on a demography associated with the user, wherein the selected driving route includes a plurality of predetermined driving tasks and a predetermined frequency at which the plurality of driving tasks occur; recording
performance errors of the user performing a simulated drive, wherein the simulated drive is performed on the selected driving route for a predetermined time period, and wherein the predetermined time period is based on the demography associated with the user;
comparing the performance errors to at least one threshold value to determine fitness to drive based on the performance errors; and
displaying outcome as pass with restrictions based on the comparison between the performance errors and the at least one threshold value.

32. The product of claim 31, wherein the instructions for performing the act of comparing the performance errors to the at least one threshold value further comprising the instructions for performing the act of:
displaying performance outcome as fail if at least two performance errors are hazardous errors.

33. The product of claim 31, wherein the instructions for performing the act of comparing the performance errors to the at least one threshold value further comprising the instructions for performing the act of:
displaying performance outcome as fail if the performance errors are at least two traffic violations.

34. The product of claim 31, wherein the instructions for performing the act of comparing the performance errors to the at least one threshold value further comprising the instructions for performing the act of:

displaying performance outcome as fail if the performance errors are at least one rule violations and at least one traffic violations.

35. The method of claim 1, wherein the at least one threshold value includes at least one hazardous error, at least two traffic violations, or at least one rule violation and at least one traffic violation.

36. The product of claim 31, wherein the at least one threshold value includes at least one hazardous error, at least two traffic violations, or at least one rule violation and at least one traffic violation.

37. The product of claim 31, wherein the instructions for performing the act of displaying the outcome as pass with restrictions based on the comparison includes displaying the outcome as pass with restrictions if the performance errors include at least one hazardous error, at least one traffic violation, or at least one rule violation.

* * * * *